United States Patent
Prasad et al.

(10) Patent No.: US 7,881,079 B2
(45) Date of Patent: Feb. 1, 2011

(54) UPS FREQUENCY CONVERTER AND LINE CONDITIONER

(75) Inventors: Pyboyina Prasad, Bangalore (IN); Rajesh Ghosh, Bangalore (IN); Damir Klikic, Waltham, MA (US)

(73) Assignee: American Power Conversion Corporation, West Kingston, RI (US)

( * ) Notice: Subject to any disclaimer, the term of this patent is extended or adjusted under 35 U.S.C. 154(b) by 506 days.

(21) Appl. No.: 12/054,109

(22) Filed: Mar. 24, 2008

(65) Prior Publication Data

US 2009/0237963 A1 Sep. 24, 2009

(51) Int. Cl.
*H02J 1/02* (2006.01)
*G05F 1/40* (2006.01)

(52) U.S. Cl. .................... 363/39; 363/44; 323/266

(58) Field of Classification Search ........... 363/39–48; 323/266, 286
See application file for complete search history.

(56) References Cited

U.S. PATENT DOCUMENTS

| | | | |
|---|---|---|---|
| 4,249,236 A | 2/1981 | Omae et al. | |
| 4,673,826 A | 6/1987 | Masson | |
| 4,683,529 A | 7/1987 | Bucher, II | |
| 4,816,982 A | 3/1989 | Severinsky | |
| 4,831,508 A | 5/1989 | Hunter | |
| 4,935,861 A | 6/1990 | Johnson, Jr. et al. | |
| 4,943,902 A | 7/1990 | Severinsky | |
| 4,949,234 A | 8/1990 | Gulczynski | |
| 4,964,029 A | 10/1990 | Severinsky et al. | |
| 4,980,812 A | 12/1990 | Johnson, Jr. et al. | |
| 5,045,989 A | 9/1991 | Higaki et al. | |
| 5,047,913 A | 9/1991 | De Doncker et al. | |
| 5,111,374 A | 5/1992 | Lai et al. | |
| 5,272,613 A * | 12/1993 | Buthker .......... 363/21.1 |
| 5,311,419 A | 5/1994 | Shires | |
| 5,371,666 A | 12/1994 | Miller | |
| 5,465,011 A | 11/1995 | Miller et al. | |
| 5,481,730 A | 1/1996 | Brown et al. | |
| 5,654,591 A | 8/1997 | Mabboux et al. | |
| 5,901,057 A | 5/1999 | Brand et al. | |
| 5,905,369 A | 5/1999 | Ishii et al. | |
| 5,982,652 A | 11/1999 | Simonelli et al. | |
| 5,998,886 A | 12/1999 | Hoshino et al. | |

(Continued)

FOREIGN PATENT DOCUMENTS

EP      0503715 A      9/1992

(Continued)

OTHER PUBLICATIONS

International Search Report and Written Opinion for PCT/US2009/038009 mailed Aug. 3, 2009.

*Primary Examiner*—Jessica Han
(74) *Attorney, Agent, or Firm*—Lando & Anastasi, LLP

(57) ABSTRACT

Systems and methods disclosed herein monitor and control input to a converter in one or more of a UPS, a frequency converter, or a line conditioner. Distortion due at least in part to ripple voltage can be removed from a control signal that controls input current to the converter. The systems and methods described herein afford a simple and effective way to reduce or eliminate one or more of subharmonic oscillation and total harmonic distortion from a converter input current during synchronous and asynchronous modes of operation. The converter may include one or more of a rectifier and an inverter.

33 Claims, 9 Drawing Sheets

U.S. PATENT DOCUMENTS

| | | | |
|---|---|---|---|
| 6,069,412 A | 5/2000 | Raddi et al. |
| 6,169,669 B1 | 1/2001 | Choudhury |
| 6,184,593 B1 | 2/2001 | Jungreis |
| 6,201,319 B1 | 3/2001 | Simonelli et al. |
| 6,236,576 B1 | 5/2001 | Munk-Nielsen |
| 6,400,586 B2 | 6/2002 | Raddi et al. |
| 6,483,730 B2 | 11/2002 | Johnson, Jr. |
| 6,600,298 B2 | 7/2003 | McDonald et al. |
| 6,661,678 B2 | 12/2003 | Raddi et al. |
| 6,728,119 B2 | 4/2004 | Reilly et al. |
| 6,737,840 B2 | 5/2004 | McDonald et al. |
| 6,757,185 B2 | 6/2004 | Rojas Romero |
| 6,795,322 B2 | 9/2004 | Aihara et al. |
| 6,838,925 B1 | 1/2005 | Nielsen |
| 6,879,061 B2 | 4/2005 | Haneda et al. |
| 6,906,933 B2 | 6/2005 | Taimela |
| 6,940,187 B2 | 9/2005 | Escobar et al. |
| 6,944,035 B2 | 9/2005 | Raddi et al. |
| 6,944,036 B2 | 9/2005 | Yan et al. |
| 6,956,755 B2 | 10/2005 | Nielsen |
| 7,005,759 B2 | 2/2006 | Ying et al. |
| 7,012,825 B2 | 3/2006 | Nielsen |
| 7,050,312 B2 | 5/2006 | Tracy et al. |
| 7,106,605 B2 | 9/2006 | Chen et al. |
| 7,126,409 B2 | 10/2006 | Nielsen |
| 7,274,112 B2 | 9/2007 | Hjort et al. |
| 2001/0033502 A1 | 10/2001 | Blair et al. |
| 2002/0044469 A1 | 4/2002 | Yasumura |
| 2002/0130648 A1 | 9/2002 | Raddi et al. |
| 2002/0191425 A1 | 12/2002 | Geissler |
| 2002/0194517 A1 | 12/2002 | Cohen et al. |
| 2003/0031037 A1 | 2/2003 | Piaskowski |
| 2003/0048005 A1 | 3/2003 | Goldin et al. |
| 2003/0048006 A1 | 3/2003 | Shelter et al. |
| 2003/0142513 A1 | 7/2003 | Vinciarelli |
| 2004/0022073 A1 | 2/2004 | Nielsen |
| 2004/0084965 A1 | 5/2004 | Welches et al. |
| 2004/0084967 A1 | 5/2004 | Nielsen |
| 2004/0155526 A1 | 8/2004 | Naden et al. |
| 2005/0024016 A1 | 2/2005 | Breen et al. |
| 2005/0024803 A1 | 2/2005 | Ying et al. |
| 2005/0036248 A1 | 2/2005 | Klikic et al. |
| 2005/0162019 A1 | 7/2005 | Masciarelli et al. |
| 2005/0168073 A1 | 8/2005 | Hjort |
| 2005/0278075 A1 | 12/2005 | Rasmussen et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0232226 A1 | 10/2006 | Ortiz |
| 2006/0238941 A1 | 10/2006 | Ingemi et al. |
| 2006/0279970 A1 | 12/2006 | Kernahan |
| 2007/0064363 A1 | 3/2007 | Nielsen et al. |
| 2007/0274115 A1 * | 11/2007 | Michaels et al. | 363/164 |
| 2008/0042491 A1 | 2/2008 | Klikic et al. |
| 2008/0061628 A1 | 3/2008 | Nielsen et al. |
| 2008/0067872 A1 | 3/2008 | Moth |
| 2008/0157601 A1 | 7/2008 | Masciarelli et al. |
| 2008/0197706 A1 | 8/2008 | Nielsen |

FOREIGN PATENT DOCUMENTS

| | | |
|---|---|---|
| WO | 2006029323 A2 | 3/2006 |
| WO | 2006029323 A3 | 3/2006 |

* cited by examiner

UPS FREQUENCY CONVERTER AND LINE CONDITIONER

BACKGROUND OF THE INVENTION

1. Field of the Invention

At least one embodiment of the present invention relates generally to control of a converter, and more specifically, to control of a converter associated with at least one of an uninterruptable power supply, a frequency converter, and a line conditioner.

2. Background of the Invention

Converters that form at least part of uninterruptible power supplies (UPS), frequency converters, or line conditioners are used to provide reliable power to many different types of electronic equipment. Often, this electronic equipment requires particular voltage and/or current input from a converter. Unwanted distortion in converter input current can pass through to converter output and be applied to electrical equipment, which results in inefficient operation, a loss of productivity, and can require costly repair or replacement of electrical components.

FIG. 1 provides a block diagram of a typical converter 100 that forms part of a UPS that provides regulated power as well as back-up power to a load 140. UPS's similar to that shown in FIG. 1 are available from American Power Conversion (APC) Corporation of West Kingston, RI. Converter 100 can include rectifier 110, inverter 120, controller 130 and battery 150. Converter 100 has inputs 112 and 114 to couple respectively to line and neutral of an input AC power source and has outputs 116 and 118 to provide an output line and neutral to load 140.

In line mode of operation, under control of controller 130, rectifier 110 receives the input AC voltage and provides positive and negative output DC voltages at output lines 121 and 122 with respect to common line 124. In battery mode of operation, upon loss of input AC power, rectifier 110 generates DC voltages from battery 150. Common line 124 may be coupled to input neutral 114 and output neutral 118 to provide a continuous neutral through converter 100. Inverter 120 receives the DC voltages from rectifier 110 and provides an output AC voltage at lines 116 and 118.

SUMMARY OF THE INVENTION

Systems and methods disclosed herein monitor and control input to a converter in one or more of a UPS, a frequency converter, or a line conditioner. To increase efficiency, distortion due at least in part to ripple voltage can be removed from a control signal. Further, input current to the converter can be controlled. This improves converter operation and reduces or eliminates at least one of harmonic distortion and subharmonic oscillation signals from converter input. At least one aspect of the invention is directed to a method for controlling a converter. The method receives a voltage signal that includes distortion such as a ripple voltage and determines a control signal based in part on the voltage signal by comparing the voltage signal with a reference signal. The control signal can include distortion associated with the ripple voltage. The method produces an average control signal having less distortion than the control signal by filtering at least a portion of the ripple voltage from the control signal. The method generates a reference current value based at least in part on the average control signal and drives an input current of the converter toward the reference current value.

At least one other aspect of the invention is directed to a system for controlling a converter. The system includes a control module associated with the converter and including a filter. The filter is adapted to receive a control signal having distortion associated with a ripple voltage, and the filter is adapted to produce an average control signal substantially free of the ripple voltage. The control module is adapted to generate a reference current value based at least in part on the average control signal, and the control module is further adapted to drive an input current of the converter toward the reference current value.

At least one other aspect of the invention is directed to a system for controlling an uninterruptable power supply. The system includes means for filtering a control signal that has distortion associated with a ripple voltage to produce an average control signal substantially free of distortion. A control module is associated with the uninterruptable power supply, and the control module is adapted to generate a reference current value based at least on part on the average control signal. The control module is further adapted to drive an input current of the uninterruptable power supply toward the reference value.

At least one other aspect of the invention is directed to a computer readable medium having stored thereon sequences of instructions including instructions that will cause a processor to control a converter to receive a voltage signal including a ripple voltage. The instructions cause the processor to control the converter to determine a control signal based in part on the voltage signal by comparing the voltage signal with a reference signal, the control signal including distortion associated with the ripple voltage. The instructions cause the processor to control the converter to produce an average control signal by filtering at least a portion of the ripple voltage from the control signal, and to generate a reference current value based at least in part on the average control signal. The instructions cause the processor to control the converter to drive an input current of the converter toward a reference current value, and to apply the input current to a rectifier associated with at least one of an uninterruptable power supply, a frequency converter, and a line conditioner.

Various embodiments of these aspects may include providing power factor correction for the input current of the converter, or shifting a phase of the average control signal. At least one embodiment may include providing an output current from the converter to a load. In various embodiments the output current from the converter to the load may have a frequency that is either synchronous or asynchronous with the input current of the converter. In on embodiment, a ripple voltage may be filtered from the voltage signal, and the voltage signal may be driven toward a reference voltage value. One embodiment includes sampling the control signal at a plurality of time instances of a time period of a voltage signal to produce an average control signal. In various embodiments, at least one of a rectifier and an inverter may be associated with a converter, and a filter may be adapted to remove at least part of a subharmonic oscillation signal, a total harmonic distortion signal, or both, from a converter input current. In one embodiment a lead-lag compensator adjusts a phase of an average control signal. In various embodiments adjustment of a pulse width modulation control signal duty cycle drives an input current of the converter toward a reference current value.

These aims and objects are achieved by the methods and systems according to independent claim 1 and any other independent claims. Further details may be found in the remaining dependent claims. Other aspects and advantages of the systems and methods disclosed herein will become apparent from the following detailed description, taken in conjunction with the accompanying drawings, illustrating the principles of the invention by way of example only.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
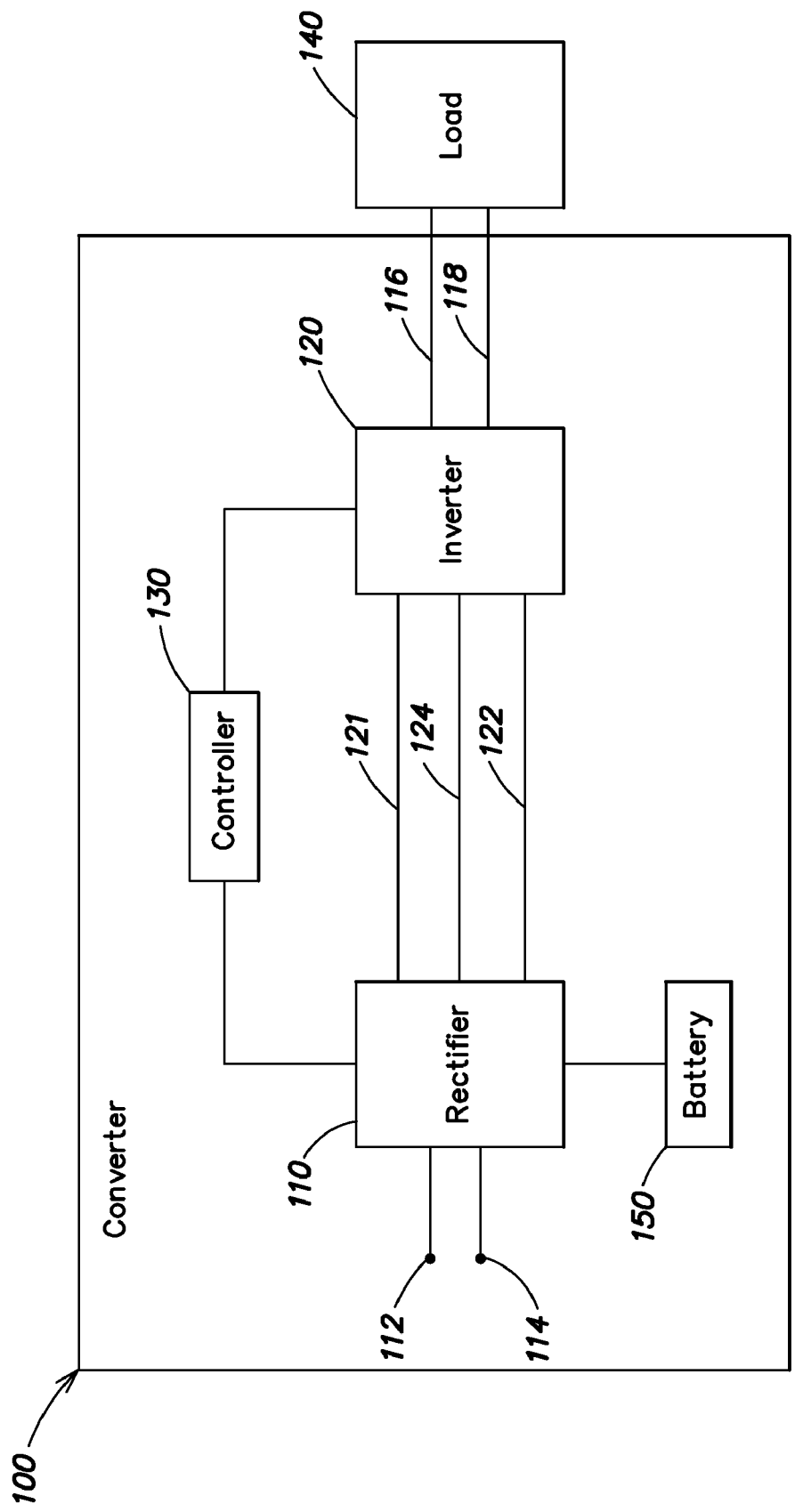
FIG. 1 is a functional block diagram illustrating a converter in accordance with an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present invention provides improved control of a converter, for example, in the converter of FIG. 1. However, embodiments of the present invention are not limited to the converter of FIG. 1, and may be used with other converters, power supplies, frequency converters, line conditioners, or other systems generally.

As shown in the drawings for the purposes of illustration, the invention may be embodied in systems and methods for controlling a converter. These systems and methods can drive an input current of a converter toward a reference current value having reduced distortion. Embodiments of the systems and methods disclosed herein allow for filtering of subharmonic oscillation, harmonic distortion, or both.

Figure 2:
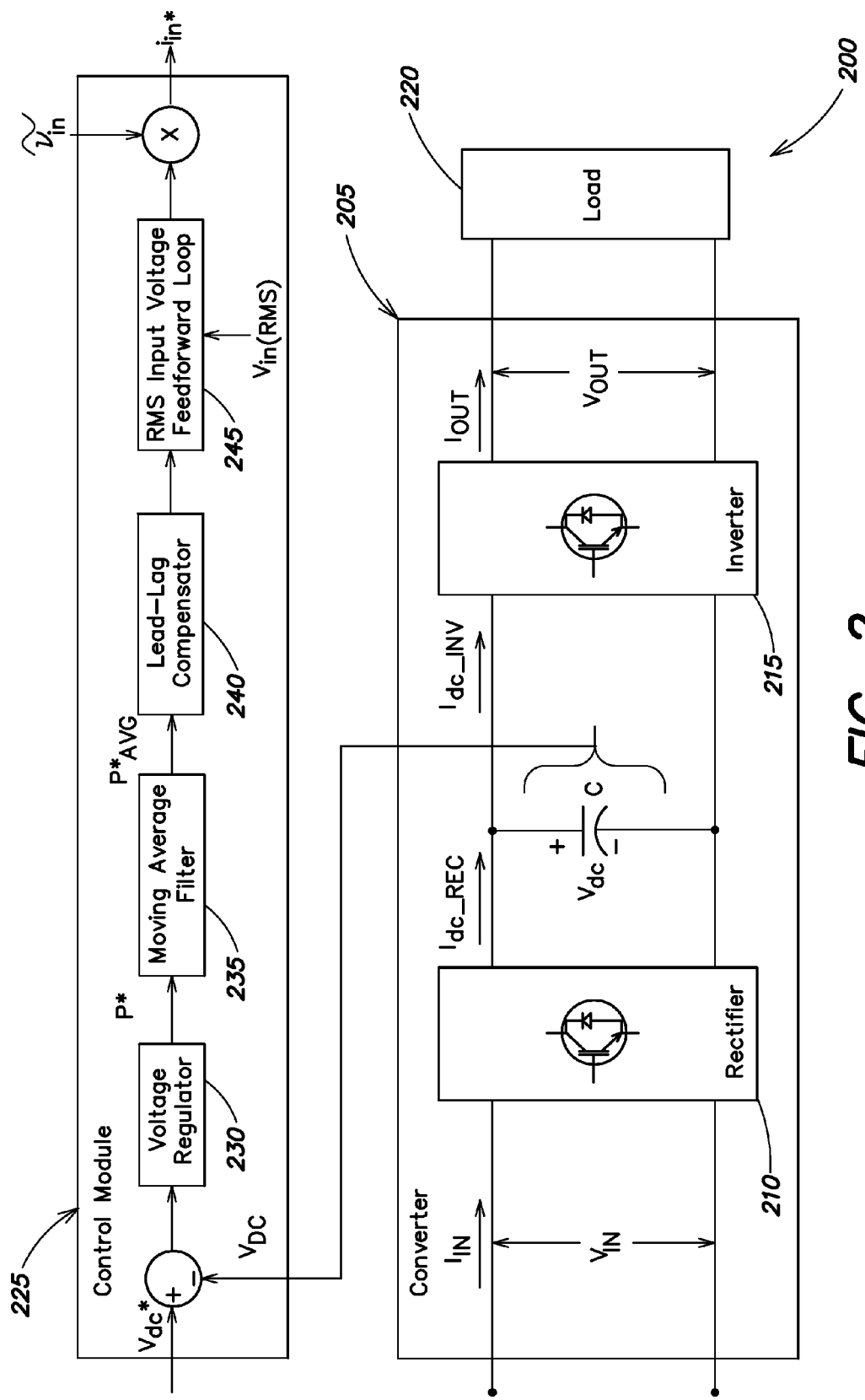
FIG. 2 is a block diagram illustrating a system for control of a converter in accordance with an embodiment of the invention.

FIG. 2 is a block diagram illustrating a system 200 for control of a converter in accordance with an embodiment of the invention. System 200 generally includes at least one converter 205. Converter 205 may include circuitry to convert an alternating current (AC) signal to a direct current (DC) signal, or to convert a DC signal to an AC signal. In one embodiment, converter 205 includes circuitry to convert an AC signal to a DC signal, and to convert the DC signal to an AC signal. Converter 205 may include an uninterruptable power supply, frequency converter, or line conditioner. For example, in one embodiment, converter 205 can include an uninterruptable power supply (UPS) that maintains a continuous or nearly continuous supply of electric power to various loads. This UPS may be of the on-line or off-line variety. In one embodiment converter 205 can be subject to compliance with harmonic standards as set forth in IEEE-519 and IEC 61000-3-2 industry standards.

Converter 205 may include at least one rectifier 210. Rectifier 210 generally includes circuitry that converts an AC signal to a DC signal. In one embodiment, rectifier 210 includes a power factor correction (PFC) rectifier. A PFC rectifier generally adjusts a power factor of rectifier 210 to decrease power loss due to reactive power losses that dissipate throughout system 200, and can appear, for example, as harmonic distortion in rectifier 210 input current where there is a non-linear load. A power factor of unity is ideal and represents a minimal loss system, and system 200 in one embodiment where rectifier 210 includes a PFC rectifier can maintain a power factor of close to 1.0, such as at least 0.90, for example. Rectifier 210 may in various embodiments provide half wave or full wave rectification.

In one embodiment, rectifier 210 of converter 205 can output voltage $V_{DC}$ and/or current $I_{DC}$ to at least one inverter 215. In another embodiment, rectifier 210 can output either $V_{DC}$ or $I_{DC}$ to at least one load 220. Inverter 215 in one embodiment can be included as part of converter 205. In one embodiment where inverter 215 is present, inverter 215 can receive DC voltage $V_{DC}$ from rectifier 210, and provide an AC output signal to load 220 that may include a nonlinear load such as a computer load or other electronic equipment. In various embodiments inverter 215 may include a three phase inverter or a single phase inverter. In one embodiment, inverter 215 may include inverters, such as those described in U.S. Pat. Nos. 6,838,925, and 7,126,409, both to Nelson and assigned to the assignee of the present application and both incorporated herein by reference in their entirety.

Load 220 may include a linear or nonlinear load. For example, load 220 may include a computer, a server, communication equipment, data storage equipment, plug-in modules, or other electronic equipment or devices requiring input power. Load 220 may include either a DC load or an AC load, and in various embodiments, load 220 can receive as input at least one of rectifier 210 and inverter 215 voltage outputs. System 200 depicts an embodiment where inverter 215 is present and supplies output to load 220. In one embodiment system 200 may not include inverter 215. For example, converter 205 may include a frequency converter, and rectifier 210 output can be applied as input to load 220.

In one embodiment, converter 205 forms part of a double conversion AC-DC-AC power converter system such as an uninterruptable power supply, frequency converter, or AC line conditioner. Such a double conversion system may operate in either synchronous or asynchronous modes of operation. During synchronous operation, converter 205 output current has a frequency that is generally synchronous with a frequency of converter 205 input current. During asynchronous operation, converter 205 output has a frequency that is generally asynchronous with a frequency of converter 205 input current. In one embodiment, the output frequency may be different from the input frequency. Under either synchronous or asynchronous operation, distortion in the input current of rectifier 210 of an AC-DC-AC double conversion system can cause total harmonic distortion (THD) and a lower input power factor.

In one embodiment of a double conversion system, converter 205 includes both rectifier 210 and inverter 215, and rectifier 210 may include a PFC front end rectifier. Generally, rectifier 210 input current may be distorted under both synchronous and asynchronous modes of operation. For example, operating an AC-DC-AC double conversion system in an asynchronous mode of operation can introduce subharmonic oscillation into the input current to rectifier 210 because rectifier 210 may draw oscillatory currents from main lines 112 and 114 of FIG. 1.

Figure 3:
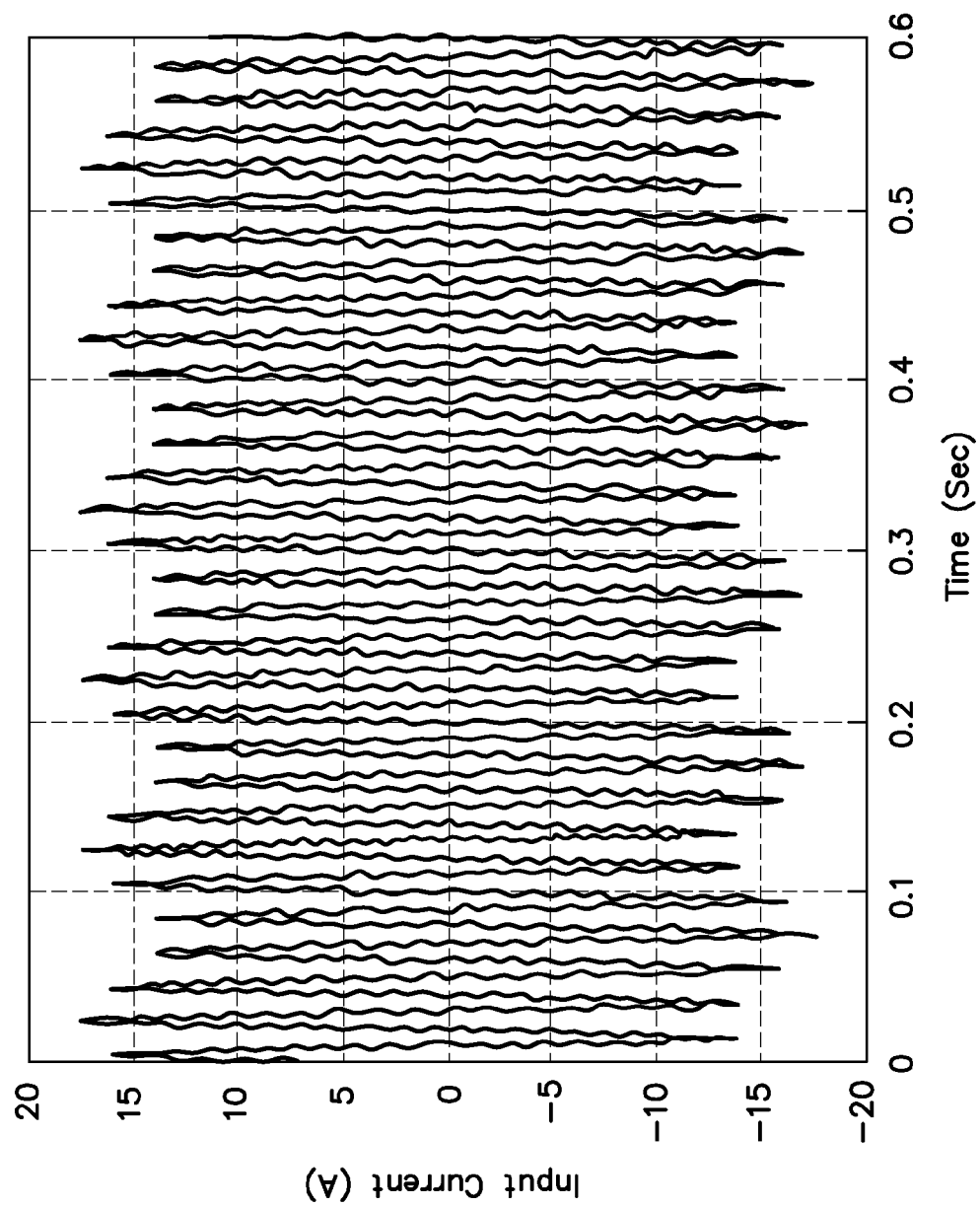
FIG. 3 is a graph illustrating subharmonic oscillation of converter input current in accordance with an embodiment of the invention.

FIG. 3 is a graph illustrating subharmonic oscillation of converter input current in accordance with an embodiment. As illustrated in the embodiment of FIG. 3, a ripple voltage $V_{DC(Ripple)}$ in the DC bus voltage $V_{DC}$ of rectifier 210 causes subharmonic oscillation and distorts rectifier 210 input current $I_{IN}$. Subharmonic oscillation as depicted in FIG. 3 may occur, for example, when rectifier 210 input current carries components at frequencies that are less than the output frequency of rectifier 210. This can cause flux saturation at a supply transformer and an inductor of rectifier 210. Subharmonic oscillation can also cause voltage waveform distortion at a point of common coupling (PCC) in system 200, and can cause unwanted visually perceptible light flickering.

Figure 4:
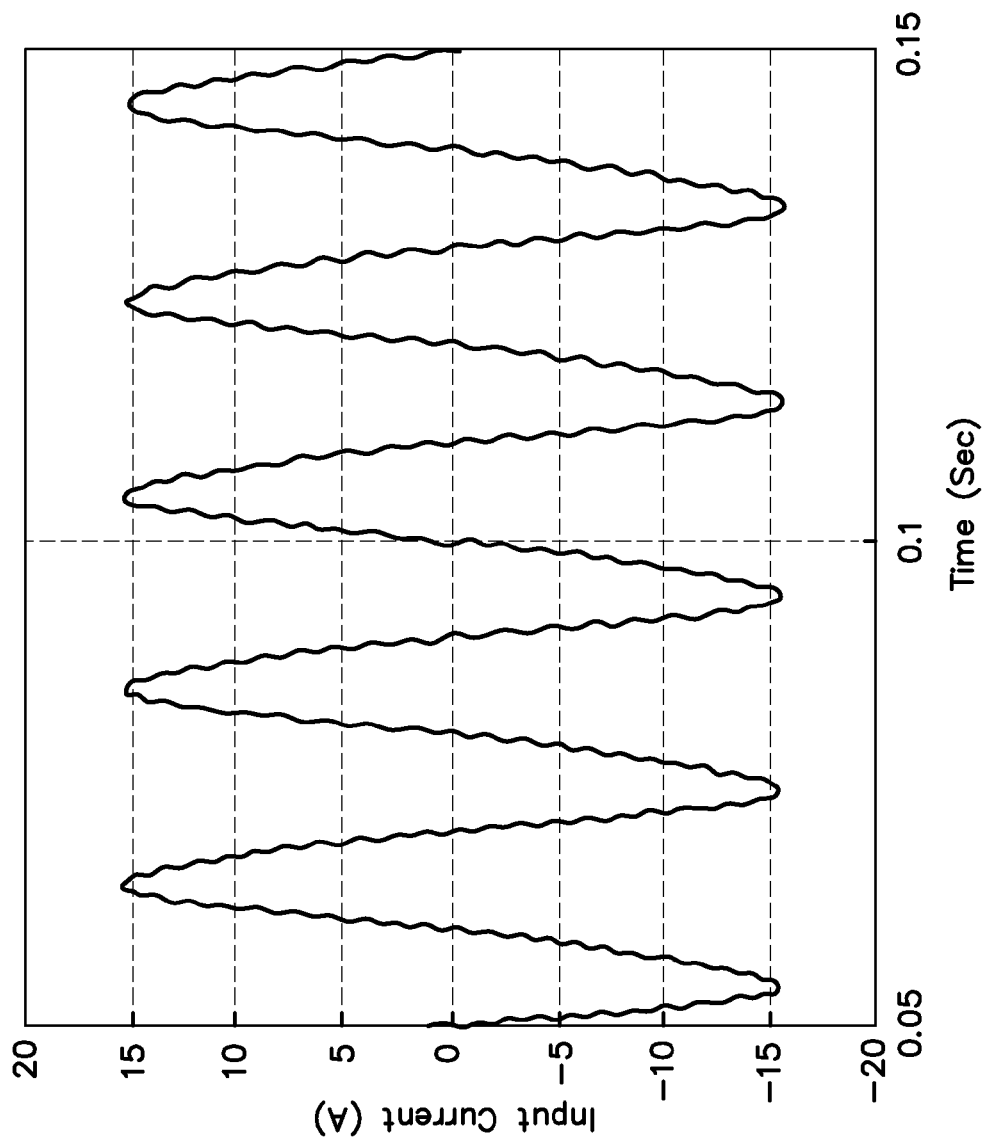
FIG. 4 is a graph illustrating total harmonic distortion of converter input current in accordance with an embodiment of the invention.

FIG. 4 is a graph illustrating total harmonic distortion of converter input current in accordance with an embodiment of the invention. In various embodiments, harmonic distortion can occur when converter 205 operates under synchronous or asynchronous modes of operation. Distortion in converter 205 input current $I_{IN}$, i.e., rectifier 210 input current, can increase $I_{IN}$ THD levels and a reduced input power factor.

Returning to FIG. 2, in one embodiment, the systems and methods disclosed herein include digital control of input characteristics into converter 205 under both synchronous and asynchronous modes of operation. For example, the control systems and methods disclosed herein can eliminate subharmonic oscillation when converter 205 of an AC-DC-AC double conversion system operates in an asynchronous mode, and can reduce input current total harmonic distortion of an AC-DC-AC double conversion system during both synchronous and asynchronous modes of operation.

With reference to system 200 of FIG. 2, characteristics of converter 205 may be controlled by at least one control module 225. Control module 225 generally controls converter 205 operation, and may include at least one processor. For example, control module 225 may control one or more of the input current $I_{IN}$ and voltage $V_{DC}$ of rectifier 210. For example, rectifier 210 can feed one or more of $I_{DC}$ and $V_{DC}$ along at least one bus line, and inverter 215 can feed load 220 with one or more of voltage $V_{OUT}$ and current $I_{OUT}$. In various embodiments of this example, the frequency of the output voltage of inverter 215 (i.e., $V_{OUT}$) may be either the same as or different from a frequency of rectifier 210 input voltage. Continuing with this example, control module 225 can adjust the input current $I_{IN}$ of rectifier 210 to hold DC bus voltage $V_{DC}$ at a reference voltage $V_{DC}^*$ by, for example, regulating rectifier 210 input current based at least in part on load 220 power demand.

In one embodiment, control module 225 includes at least one voltage regulator 230. Voltage regulator 230 maintains a generally constant output voltage level and may include, for example, any of a proportional (P) type, a proportional-integral (PI) type, or a proportional-integral-differential (PID) type voltage regulator. The output of voltage regulator 230 can, in an embodiment, be input into at least one filter, such as at least one moving average filter 235. Moving average filter 235 generally operates by averaging a number of sampling points from an input signal to produce each point in an output signal. Moving average filter 235 can filter the output of voltage regulator 230, and in various embodiments, moving average filter 235 can include a first order system having a low time constant to minimize the impact on rectifier 210 voltage loop stability. In one embodiment moving average filter includes a finite impulse response (FIR) filter.

Although not shown in FIG. 2, it should be appreciated that control module 225 output may be received as converter 205 input. For example, control module 225 reference current $I_{IN}^*$ may be applied to converter 205 input at rectifier 210. In one embodiment, control module 225 drives converter 205 input current $I_{IN}$ towards a value of control module 225 reference current $I_{IN}^*$. In one embodiment, converter 205 includes control module 225. For example, control module 225 may be integrated into or part of converter 205.

Figure 5:
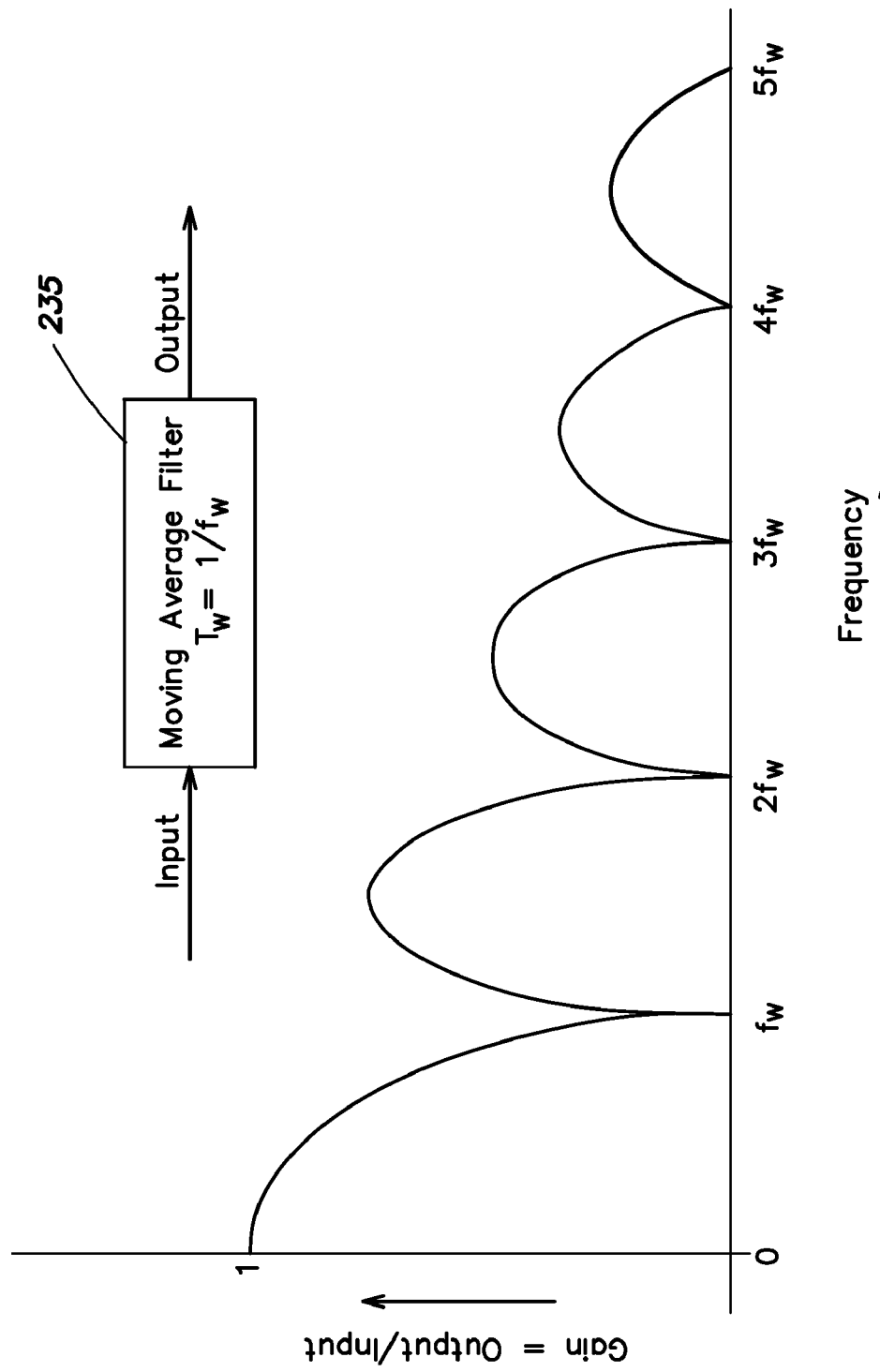
FIG. 5 is a graph illustrating gain characteristics of a moving average filter in accordance with an embodiment of the invention.

FIG. 5 is a graph illustrating gain characteristics of moving average filter 235 in accordance with an embodiment of the invention. As illustrated in FIG. 5, moving average filter 235 may offer zero gain at frequency $f_W$ and its multiples and unity gain at a DC signal. For example, if moving average filter 235 input is a DC signal, it will pass to output without attenuation. In one embodiment, if moving average filter 235 input is a 60 Hz signal and the time window $T_W=1/f_W$ (i.e., 1/60 Hz in this example), then moving average filter 235 output can be zero. Moving average filter 235 output can also be zero at multiples of the input frequency $2f_W$, $3f_W$, etc. (i.e., 120 Hz, 180 Hz, 240 Hz, etc.). In one embodiment, moving average filter 235 input signal frequency may be 50 Hz where $T_W=1/60$ Hz. In this example, the gain may be between zero and one. In one embodiment of this example, the gain may be less than or equal to 0.25.

With further reference to FIG. 2, system 200 may also include at least one lead lag compensator 240, which in one embodiment can adjust a phase lag that may be introduced by moving average filter 235. For example, moving average filter 235 may introduce a phase lag at or around the zero-crossover frequency of a voltage loop. In this embodiment, lead lag compensator 240 may be connected in series with moving average filter 235 to adjust this lag in frequency response.

For example and with respect to equation (1), in one embodiment, moving average filter 235 can include a first order lowpass filter, where $G_{MAF}(s)$ is an equivalent s-domain (i.e., frequency domain) transfer function of moving average filter 235 with $\tau_{MAF}$ as its time constant and where $1+s\tau_{MAF}$ is the effective pole of moving average filter 235. In one embodiment, the effective pole of moving average filter 235 can be sufficiently away from the voltage loop crossover frequency so that it does not disturb the stability of the voltage loop that generally controls total harmonic distortion in input current $I_{IN}$ of rectifier 210. For example, the effective pole of moving average filter 235 may be at a location greater than or equal to 60 Hz, with the voltage loop crossover frequency located at about 6-10 Hz.

$$G_{MAF}(s) = \frac{1}{1 + s\tau_{MAF}} \quad (1)$$

In one embodiment where system 200 includes lead lag compensator 240, a phase shift introduced by moving average filter 235 around the zero crossover frequency can be adjusted by connecting lead lag compensator 240 in series with moving average filter 235, as shown in equation (2), where $G_{LEAD-LAG}(S)$ is the s-domain transfer function of lead-lag compensator 240, and $T_Z$ and $0.1\,T_Z$ are time constants of the zero and pole of lead lag compensator 240. In one embodiment, the time constant $T_Z$ may be set at $\tau_{MAF}$, (i.e., $T_Z=\tau_{MAF}$) to compensate for the pole in moving average filter 235 in the embodiment of equation (1). In another embodiment, time constant $T_Z$ may be placed around $\tau_{MAF}$ to reduce the effect of the pole of moving average filter 235.

$$G_{LEAD-LAG}(s) = \frac{1+sT_Z}{1+(0.1 \times T_Z)s} \qquad (2)$$

In one embodiment, the steady state root mean square (RMS) input voltage $V_{IN(RMS)}$ can decrease from a nominal value of, for example, 120V as converter 205 output power increases or due to supply regulation. This may occur in embodiments including a nonlinear load 220 such as a computer. In one embodiment RMS voltage correction may be applied to control module 225 to compensate for this decrease to realize constant power control, (i.e., to keep the output of voltage regulator 230 P* generally unchanged during input mainline voltage $V_{IN}$ fluctuations). In another embodiment, RMS voltage correction can be used to improve the dynamic response of system 200 against line disturbances such as changes (e.g., swell or dip) in the input voltage $V_{IN}$. For example, control module 225 may include Root Mean Square (RMS) input voltage feedforward loop 245. Generally, a drop in $V_{IN(RMS)}$ can be compensated by employing RMS input voltage feedforward loop 245, which in one embodiment adjusts reference current $I_{IN}*$ so that $V_{DC}$ remains at $V_{DC}*$ at full load. In one embodiment, RMS input voltage feedforward loop 245 may include at least one RMS voltage correction controller, which, for example, may include an integral type controller or a low pass filter network associated with mathematical operations or a control algorithm including, for example, digital signal processing (DSP) code to compensate for a steady state drop in input mainline voltage $V_{IN}$ and to keep $V_{DC}$ at or near $V_{DC}*$ at any load 220 condition, including a full load condition for a nonlinear load 220.

RMS input voltage feedforward loop 245 generally realizes constant power control, for example, in applications involving multi-phase inverters with load sharing between input phases. RMS input voltage feedforward loop 245 may also improve the dynamic response of converter 205, such as the response of DC bus voltage $V_{DC}$ and input currents during line disturbances, such as changes in input voltage $V_{IN}$.

Figure 6:
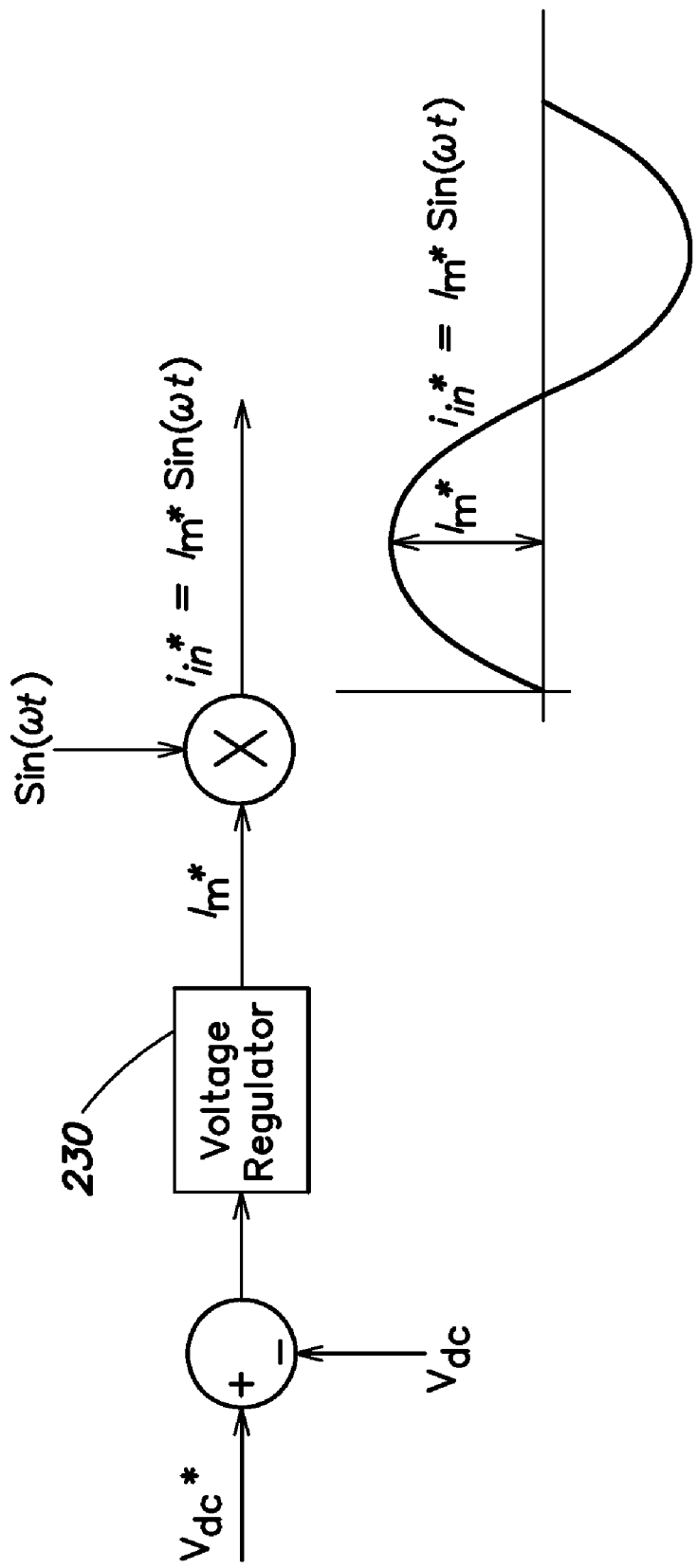
FIG. 6 is a block diagram illustrating control of a converter in accordance with an embodiment of the invention.

In one embodiment where control module 225 does not include RMS input voltage loop 245, voltage regulator 230 output may include an amplitude reference current for input current $I_{IN}$. FIG. 6, which is a block diagram illustrating control of converter 205, includes an example of this embodiment. As illustrated in FIG. 6, the output of voltage regulator 230 may be connected to moving average filter 235 (not shown in FIG. 6) to filter a ripple from voltage regulator output current $I_m*$.

With further reference to FIG. 2, $V_{IN(RMS)}$ is the root mean square value of input voltage $V_{IN}$, P* is the input power reference value, $I_{IN}*$ is the reference input current value used to control rectifier 210. In one embodiment input current $I_{IN}$ may be in phase with $V_{IN}$, and DC bus currents $I_{DC\_REC}$ (rectifier 210 output current) and $I_{DC\_INV}$ (inverter 215 input current) can include at least one of a DC term, a switching frequency term, and a low frequency AC term. The AC terms in one or more of $I_{DC\_REC}$ and $I_{DC\_INV}$ may cause corresponding ripple components in DC bus voltage $V_{DC}$. In one embodiment, when compared to the low frequency ripple voltage, the switching frequency ripple voltage in $V_{DC}$ may be ignored due to its lower amplitude. Therefore, the steady state bus voltage $V_{DC}$ can include a low frequency ripple voltage $V_{DC(Ripple)}$ in addition to reference voltage $V_{DC}*$ as shown in equation (3).

$$V_{DC}=V_{DC}*+V_{DC(Ripple)} \qquad (3)$$

In one embodiment that includes inverter 215, $V_{DC(Ripple)}$ can be divided into the components shown in equation (4), where $V_{DC\_REC(Ripple)}$ and $V_{DC\_INV(Ripple)}$ include the ripple voltages contributed by rectifier 210 and inverter 215, respectively.

$$V_{DC}(\text{Ripple})=V_{DC\_REC(Ripple)}+V_{DC\_INV(Ripple)} \qquad (4)$$

In an embodiment where converter 205 includes a single DC bus, ripple voltage $V_{DC\_(Ripple)}$ may contain components at $2 \times f_{IN}$ and its multiples, where $f_{IN}$ is converter 205 line frequency. In an alternate embodiment where converter 205 includes a split DC bus, ripple voltage $V_{DC\_(Ripple)}$ may contain components at $f_{IN}$ and its multiples. Analogously, in one embodiment where inverter 215 is present, ripple voltage $V_{DC\_INV(Ripple)}$ may contain components at inverter 215 output frequency $f_{OUT}$ and its multiples where inverter 215 includes a multilevel inverter, and at $2 \times f_{OUT}$ where inverter 215 includes a two level inverter, for example.

In one embodiment at steady state, voltage regulator 230 processes ripple voltages $V_{DC\_(Ripple)}$ and $V_{DC\_INV(Ripple)}$ and introduces corresponding ripple terms into reference power signal P*. In this embodiment, unless these ripple terms are filtered from P*, for example by moving average filter 235, they can be passed onto reference current value $I_{IN}*$. In one embodiment, ripple in the reference current value $I_{IN}*$ that is introduced by $V_{DC\_REC(Ripple)}$, unless filtered out, can cause harmonic distortion in rectifier 210 input current $I_{IN}$ as control module 225 drives $I_{IN}$ towards the value of $I_{IN}*$. Furthermore, in one embodiment, ripple that is introduced by $V_{DC\_INV(Ripple)}$ can cause subharmonic oscillation and harmonic distortion in $I_{IN}$ when, for example, converter 205 is operating in an asynchronous mode of operation, (e.g., where output current $I_{OUT}$ has a frequency $f_{OUT}$ that is asynchronous with input current $I_{IN}$ frequency $f_{IN}$.) In an alternate embodiment, ripple that is introduced by $V_{DC\_INV(Ripple)}$ may cause harmonic distortion in $I_{IN}$ when, for example, converter 205 is operating in a synchronous mode of operation, (e.g., where output current $I_{OUT}$ has a frequency $f_{OUT}$ that is synchronous with input current $I_{IN}$ frequency $f_{IN}$.)

In one embodiment, converter 205 may include an AC-DC single conversion system. This may occur, for example, when inverter 215 is absent and load 220 includes a DC load connected across a DC bus line to rectifier 210. In one embodiment of this example, $V_{DC}$ may include only the ripple voltage $V_{DC\_REC(Ripple)}$, which can increase total harmonic distortion in rectifier 210 input current $I_{IN}$. In this example, ripple voltage $V_{DC\_REC(Ripple)}$ can be synchronized with $V_{IN}$, and as a result in this embodiment rectifier input current $I_{IN}$ may not include subharmonic oscillation. Continuing with this example, input current $I_{IN}$ may include current components at $f_{IN}$ and its multiples. Generally, input current $I_{IN}$ may have a fundamental frequency, (e.g., line frequency) as well as current component and harmonic current components at various frequencies that can include multiples of the line frequency. Total harmonic distortion of input current $I_{IN}$ in this example may be controlled by a low bandwidth voltage loop, (e.g., 6-10 Hz) in compliance with harmonic standards IEEE-519 and IEC 61000-3-2.

In one embodiment converter 205 can include an AC-DC-AC double conversion system having rectifier 210 and inverter 215. In this embodiment, when inverter 215 is operating in synchronized mode, (i.e., when the output current $I_{OUT}$ includes a frequency that is synchronous with the frequency of input current $I_{IN}$) ripple voltages $V_{DC\_REC(Ripple)}$ and $V_{DC\_INV(Ripple)}$ can be synchronized with the frequency of input current $I_{IN}$. In this example subharmonic oscillation generally is not perceptible in input current $I_{IN}$, and the ripple voltages generally cause only harmonic distortion. In one embodiment of this example, where inverter 215 supplies a resistive load 220, ripple voltages $V_{DC\_REC(Ripple)}$ and $V_{DC\_INV(Ripple)}$ may at least in part cancel each other out, thus reducing harmonic distortion levels. However, in an embodiment where inverter 215 supplies a nonlinear load 220 or a reactive load 220, ripple voltages $V_{DC\_REC(Ripple)}$ and $V_{DC\_INV(Ripple)}$ typically do not cancel each other out, and as a result harmonic distortion associated with these ripple voltages, unless filtered, can appear in input current $I_{IN}$.

In another embodiment, when inverter 215 operates in an asynchronous mode of operation so that the frequency ($f_{OUT}$) of $I_{OUT}$ is different than the frequency ($f_{IN}$) of $I_{IN}$, ripple voltage $V_{DC\_INV(Ripple)}$ may not be synchronized with either $V_{DC\_REC(Ripple)}$ or with $V_{IN}$. In this example, subharmonic oscillation at a frequency that is the absolute value of the difference between $f_{IN}$ and $f_{OUT}$ (i.e., $|f_{IN}-f_{OUT}|$) can occur in reference input current $I_{IN}*$. In one embodiment of this example, moving average filter 235 filters this subharmonic oscillation that may be present at the output of voltage regulator 230 P* so that control module 225 drives input current $I_{IN}$ towards a reference current value $I_{IN}*$ that includes a reduced level of subharmonic oscillation.

Figure 7:
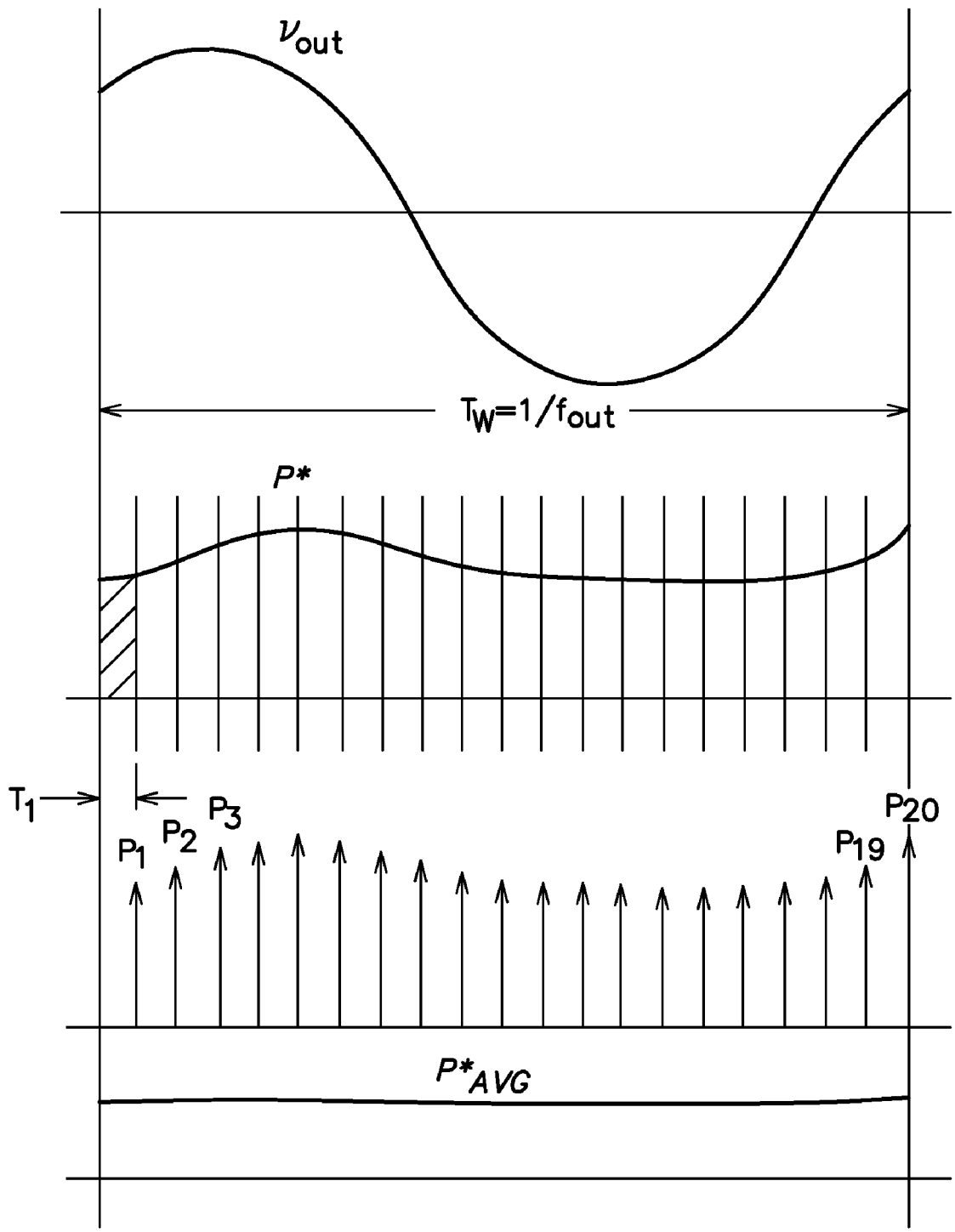
FIG. 7 is a graph illustrating signal filtration by a moving average filter in accordance with one embodiment of the invention.

In various embodiments, control module 225 can filter ripple voltages from reference power signal P*. For example, control module 225 may implement digital filtration using moving average filter 235. FIG. 7 is a graph illustrating signal filtration of voltage regulator 230 output by moving average filter 235 in accordance with one embodiment. Moving average filter 235 typically includes a moving window $T_W$, which in one embodiment can be the time duration over which the averaging of the sampling points is performed. For example and as illustrated in FIG. 7, moving window $T_W$ may be the inverse of output frequency $f_{OUT}$ of the output voltage of voltage regulator 230, (i.e., $1/f_{OUT}$.)

Figure 8:
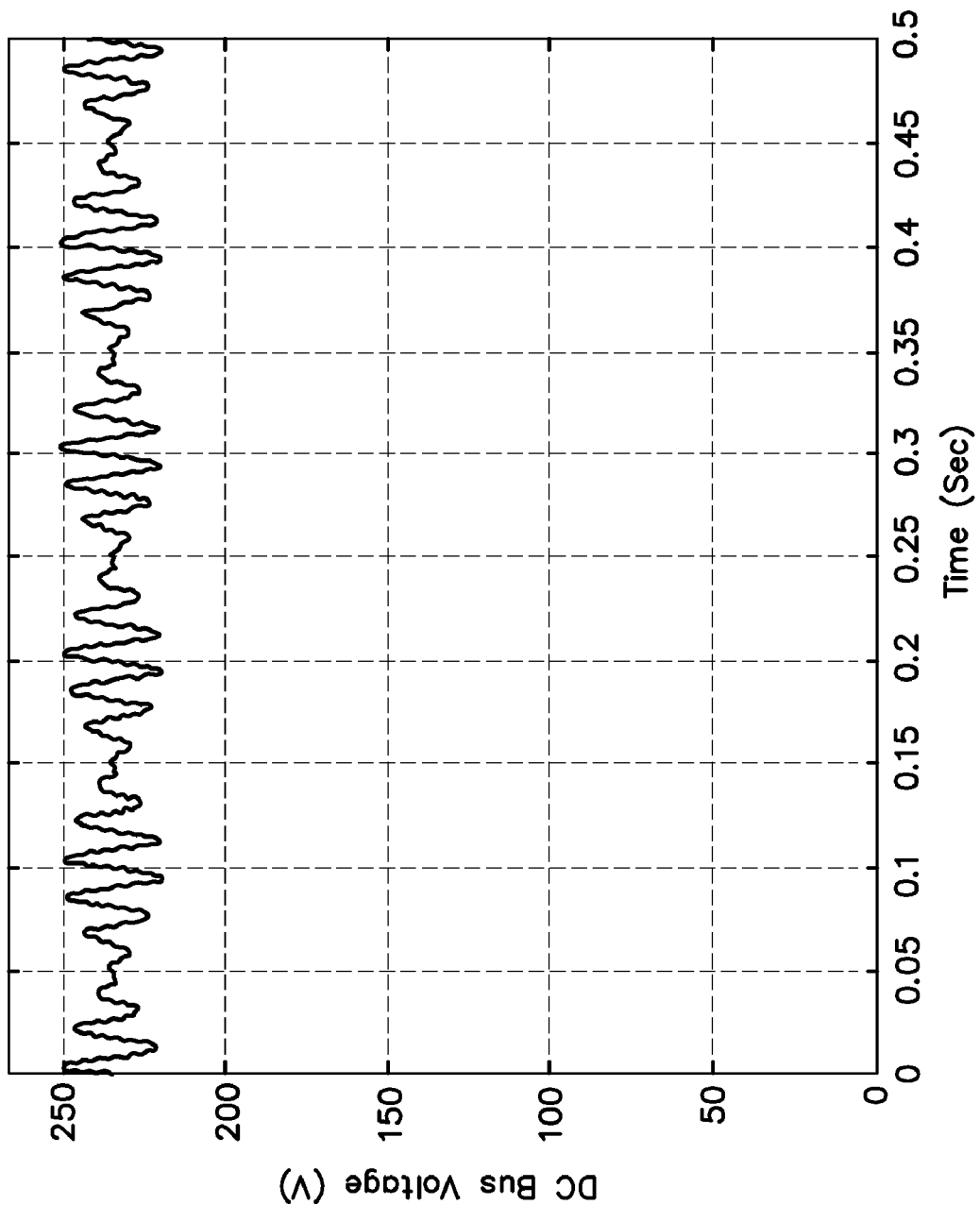
FIG. 8 is a graph depicting operation of a converter in accordance with one embodiment of the invention.

In one embodiment, moving window $T_W$ of moving average filter 235 can correspond to the periodicity of the ripple in reference power signal P*. For example, when converter 205 includes split DC bus lines and when inverter 215 includes a multi-level inverter, the ripple voltage in $V_{DC}$, and hence in P* can have a periodicity of $1/(|f_{IN}-f_{OUT}|)$ during asynchronous operation and $1/f_{IN}$ during synchronous operation. For example, in an embodiment where $f_{IN}=50$ Hz and $f_{OUT}=60$ Hz (i.e., asynchronous operation), moving window $T_W$ equals 100 ms. This embodiment is illustrated in FIG. 8, which is a graph depicting operation of a converter in accordance with one embodiment of the invention. FIG. 8 depicts an example of DC bus voltage of an AC-DC-AC double conversion system during asynchronous operation including a resistive load 220, an input frequency $f_{IN}$ of 50 Hz and an output frequency $f_{OUT}$ of 60 Hz in accordance with one embodiment of the invention. This illustrative embodiment, while functional, can introduce delay in the voltage loop and can require significant memory storage capacity to store all samples of reference power signal P* in a 100 ms window.

In another embodiment, moving window $T_W$ can be set to the inverse of the output frequency as shown in equation (5) when inverter 215 includes a multi-level inverter and the inverse of twice the output frequency as shown in equation (6) when inverter 215 includes a two-level inverter.

$$T_w = \frac{1}{f_{OUT}} \quad (5)$$

$$T_w = \frac{1}{(2 \times f_{OUT})} \quad (6)$$

In one embodiment, inverter ripple voltage $V_{DC\_INV(Ripple)}$ can cause subharmonic oscillation in reference current value $I_{IN}*$ during asynchronous operation. In this embodiment, for example, it can be sufficient for moving average filter 235 to filter out the ripple in reference power signal P* caused by $V_{DC\_INV(Ripple)}$. However, in a related embodiment moving average filter 235 can also attenuate the ripple in reference power signal P* caused by $V_{DC\_REC(Ripple)}$, which reduces distortion in reference input current $I_{IN}*$, and thus also in input current $I_{IN}$.

In various embodiments, when converter 205 is in a synchronous mode of operation, inverter 215 can supply at least one load 220 that may include at least one nonlinear load or reactive load. In such an embodiment, inverter ripple voltage $V_{DC\_INV(Ripple)}$ and rectifier ripple voltage $V_{DC\_REC(Ripple)}$ generally do not cancel each other out, and moving average filter 235 can attenuate the ripple in reference power signal P* due, at least in part, to one or more of $V_{DC\_INV(Ripple)}$ and $V_{DC\_REC(Ripple)}$ to obtain low total harmonic distortion (THD) in the input current $I_{IN}$. Although the levels of THD can vary widely, in one embodiment THD levels can be, for example, less than 5%. In one embodiment, THD levels in input current $I_{IN}$ can be, for example, less than or equal to 3.5%. Embodiments where THD level in the input current $I_{IN}$ is greater than 5% are possible.

Moving average filter 235 may, for example, include a digital 20×m sampling point moving average filter 235, where 20×m number of memory locations store reference power signal P* samples over moving window $T_W$. In this example, 20×m is the number of available samples of P* in moving window $T_W$. Continuing with this illustrative embodiment, a 20×m sampling point moving average filter may be used to obtain the average of reference power signal $P_{AVG}*$ over moving window $T_W$ as shown in equation (7), where $T_W$ can be updated at the sampling frequency.

$$P^*_{AVG} = \frac{\sum_{n=1}^{20 \times m} P_n}{20 \times m} \quad (7)$$

The above-illustrated embodiment, however, can require significant memory storage capacity to store all sampled data points of reference power signal P*, i.e., 20×m numbers.

FIG. 7, as described above, illustrates an embodiment operable with reduced memory storage requirements. In FIG. 7, a one period cycle of converter 205 output voltage $V_{OUT}$, which may in various embodiments correspond to rectifier 210 input frequency or inverter 215 output frequency, is depicted in this example with moving window $T_W$ equal to $1/f_{OUT}$. In the embodiment of FIG. 7, moving window $T_W$ is divided into twenty equal intervals of time period $T_W/20$, where $T_1$ is the first interval. In this illustrative embodiment, the samples of P* (i.e., m samples) within interval $T_1$ can be averaged and stored as $P_1$. This process repeats to determine the average reference power values $P_{AVG}*$ over each of the 20 intervals, (i.e., $T_W/20$ in this example) can be obtained and stored in memory as $P_1, P_2, P_3, \ldots P_{19}, P_{20}$. In this example moving average filter 235 includes a twenty point moving average filter to obtain the average reference power value $P_{AVG}^*$. It is appreciated that in this example moving window $T_W$ is updated every $T_W/20$ second interval and that in this example 20 storage locations can be used to obtain an average reference power value $P_{AVG}^*$ of 20×m number of sample points, as shown in equation (8).

$$P_{AVG}^* = \frac{\sum_{n=1}^{20} P_n}{20} \quad (8)$$

In one embodiment, converter 205 input signal can include a mixture of a DC voltage component, a 50 Hz voltage component, and a 60 Hz ripple voltage component, where $T_W=\frac{1}{60}$ Hz. In this example, the DC signal can pass through moving average filter 235 output without attenuation, the 60 Hz component can be attenuated (e.g., substantially to zero) so that it does not pass through moving average filter 235 output, and the 50 Hz component can be at least partially attenuated. In this example, the 60 Hz component can be more completely attenuated than the 50 Hz component. In this illustrated embodiment, moving average filter 235 output can include a full DC signal, no 60 Hz component, and a substantially attenuated 50 Hz component, as illustrated by $P^*_{AVG}$ of FIG. 7.

In one embodiment, control module 225 drives input current $I_{IN}$ toward the reference current $I_{IN}^*$ value. For example, control module 225 may control input current $I_{IN}$ by adjusting a duty cycle of a pulse width modulation (PWM) control signal. In another embodiment, control module 225 can drive voltage $V_{DC}$ towards reference voltage $V_{DC}^*$ by adjusting a PWM control signal duty cycle. Although not depicted in FIG. 2, control module 225 in one embodiment includes at least one control signal generator. The control signal generator may be integral to or associated with control module 225, and in one embodiment the control signal generator can generate at least one carrier signal.

Generally, the control signal generator can create, form, propagate or otherwise output a control signal such as a pulse width modulation (PWM) control signal. In various embodiments, the control signal generator or control module 225 can adjust a duty cycle of a PWM control signal in rectifier 210 to drive input current $I_{IN}$ toward reference input current value $I_{IN}^*$. In one embodiment, the control signal generator can include at least one digital circuit adapted to output a pulse width signal. The control signal generator may also include, for example, circuits or other generators for producing a PWM control signal by any of an intersective method, delta method, sigma delta method, or other forms of waveform generation and manipulation.

It is appreciated that in at least one embodiment the elements of system 200 can include the elements of converter 100. For example in various embodiments control module 225 includes controller 130, rectifier 110 includes rectifier 210, inverter 215 includes inverter 120, and load 220 includes load 140, et cetera. It is further evident that in one embodiment system 200 includes elements not shown in FIG. 2 that correspond to elements of FIG. 1, such as battery 150, or multiple input, output, bus, or main lines, for example.

Figure 9:
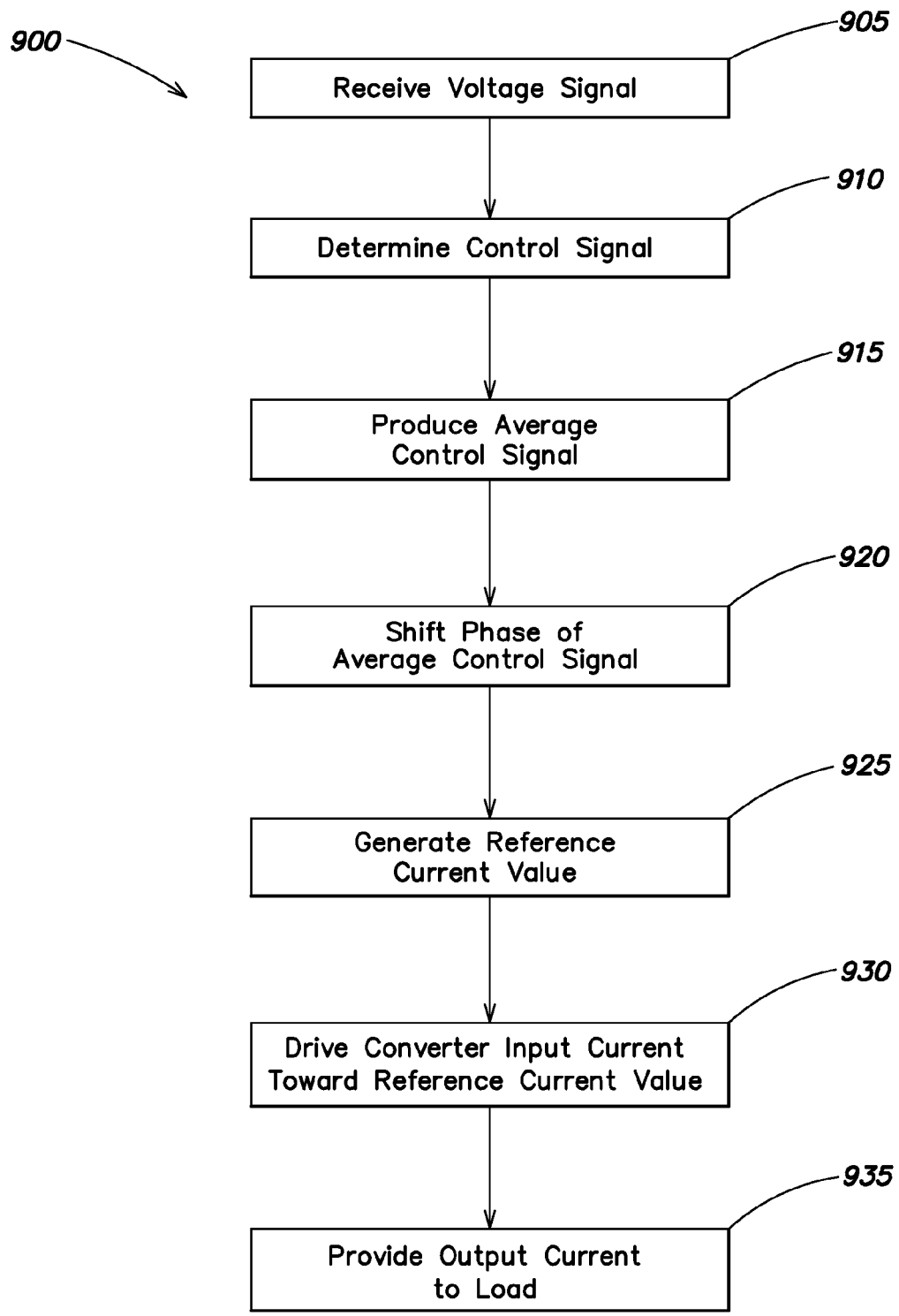
FIG. 9 is a flow chart depicting a method for controlling a converter in accordance with an embodiment of the invention.

FIG. 9 is a flow chart depicting a method 900 for controlling a converter in accordance with one embodiment of the invention. In one embodiment method 900 includes the act of receiving a voltage signal (ACT 905). For example, receiving a voltage signal (ACT 905) can include receiving a DC rectifier voltage $V_{DC}$ of, for example, an uninterruptible power supply, frequency converter, or line conditioner. A DC rectifier voltage may also be referred to as a DC voltage, rectifier output voltage, DC bus voltage, or inverter input voltage. In one embodiment, receiving a voltage signal (ACT 905) includes receiving a voltage signal that includes at least one ripple voltage or other form of distortion. Receiving a voltage signal (ACT 905) may also include, for example receiving, by one or more of a controller, control module, receiver, or a voltage regulator, a voltage signal. In various embodiments a voltage regulator that receives or is configured to receive a voltage signal may include any of a proportional, proportional-integral, or proportional-integral-derivative voltage regulator.

Method 900 may include the act of determining a control signal (ACT 910). Determining a control signal (ACT 910) can include evaluating the received voltage signal. For example, determining a control signal may include determining a control signal based at least in part on a voltage signal by comparing the voltage signal with a reference signal. In one embodiment the control signal can include distortion associated with at least one ripple voltage.

In an illustrative embodiment, a received voltage signal (ACT 905) can include distortion. Method 900 may evaluate the received voltage signal to determine or generate a control signal. For example, a voltage regulator may receive as input the voltage signal and produce as output a power control signal. In one embodiment of this example the power control signal can include ripple voltage or other distortion that is also present in the received voltage signal. Determining the control signal (ACT 910) may include evaluating the received voltage signal together with a reference voltage signal to produce a reference power signal $P^*$. The reference power signal may include one or more ripple voltages associated with any of a rectifier ($V_{DC\_REC(Ripple)}$) and an inverter ($V_{DC\_INV(Ripple)}$). In one embodiment a voltage regulator can drive the received voltage toward a reference voltage signal.

Method 900 may evaluate the control signal, such as a reference power signal that includes distortion associated with one or more ripple voltages, for example, to produce an average control signal (ACT 915). Producing an average control signal (ACT 915) in one embodiment includes receiving a control signal that includes distortion and filtering the distortion from the control signal to produce an average control signal. For example, one or more moving average filters can receive a reference power signal that includes ripple voltage distortion, filter the ripple voltage distortion from the reference power signal $P^*$, and produce as output an average reference power control signal $P_{AVG}^*$. The average reference power control signal $P_{AVG}^*$ may be substantially free of ripple voltage or may include ripple voltage of an amplitude that is less than an amplitude of the reference power signal $P^*$ ripple voltage. In various embodiments other types of filters, such as finite impulse response (FIR) filters may be used to produce an average control signal (ACT 915).

In one embodiment, the average control signal can be substantially free from distortion associated with ripple voltage. The degree with which ripple voltages are removed from a control signal when producing an average control signal (ACT 915) generally varies. For example, in one embodiment the amplitude of ripple voltage in an average control signal is less than half of the amplitude of ripple voltage in the control signal. In various embodiments, the amplitude of ripple voltage in the average control signal that, for example, has been processed by a moving average filter, can be less than 20% of the amplitude of the control signal before moving average filter processing. In one embodiment a moving average filter can eliminate 90% or more of the ripple voltage from the control signal when producing the average control signal (ACT 915).

Method 900 may include the act of shifting a phase of the average control signal (ACT 920). For example, a moving average filter associated with producing an average control signal (ACT 915) such as an average reference power control signal $P_{AVG}^*$, a moving average filter can introduce a phase lag into the average reference power control signal $P_{AVG}^*$. In this example, a lead lag compensator may process the average reference power control signal by shifting its phase (ACT 920) to correct the phase lag introduced by the moving average filter.

In one embodiment, method 900 can include the act of generating at least one reference current value $I_{IN}^*$ (ACT 925). In one embodiment, generating at least one reference current value (ACT 925) includes generating a reference current value at a first sampling time based in part on converter input voltage and DC bus voltage, (e.g., rectifier or capacitor voltage $V_{DC}$). For example, the reference current value can be determined based on part by evaluating the sampled DC bus voltage $V_{DC}$, and one or more of converter input voltage $V_{IN}$, load current $I_{OUT}$, rectifier current $I_{DC\_REC}$, and inverter current $I_{DC\_INV}$.

Method 900 may include the act of driving an input current of the converter $I_{IN}$ toward the reference input current value $I_{IN}^*$ (ACT 930). In one embodiment driving the input current toward the reference input current value (ACT 930) includes adjusting a pulse width modulation (PWM) control signal duty cycle. Generally, adjusting a duty cycle causes converter input current $I_{IN}$ such as a rectifier input current to adjust to a value nearer or substantially equal to reference input current value $I_{IN}^*$. In one embodiment, driving input current $I_{IN}$ toward reference input current value $I_{IN}^*$ (ACT 930) can include adjusting the PWM control signal duty cycle to cause input current $I_{IN(n+1)}$ at a $(n+1)^{th}$ sampling time toward a reference current value $I_{IN(n)}^*$ at an instant of an $n^{th}$ sampling time. As such, it is appreciated that in various embodiments input current $I_{IN}$ may follow the value of reference input current $I_{IN}^*$ by one or more sampling periods, i.e., a delay of one or more switching cycles. In one embodiment adjusting the PWM control signal duty cycle includes driving the voltage $V_{DC}$ toward a reference voltage value $V_{DC}^*$.

In one embodiment, driving input current $I_{IN}$ toward reference input current $I_{IN}^*$ (ACT 930) includes adjusting duty cycle of a PWM control signal. This causes input current $I_{IN}$ to adjust to a value substantially equal to reference inductor current $I_{IN}^*$ at, for example, a point in time after a first sampling time and before a subsequent (e.g., second) sampling time. At, for example, a second sampling time (n+1) reference input current $I_{IN(n+1)}^*$ may have a different value than that of reference input current at the first ($n^{th}$) sampling time $I_{IN(n)}^*$ due, for example, to the power requirements of a nonlinear load. However, adjusting the PWM control signal duty cycle in an embodiment causes input current $I_{IN(n+1)}$ at a $(n+1)^{th}$ sampling time to substantially equal reference inductor current $I_{IN(n)}^*$ at the $n^{th}$ sampling time. As such, in various embodiments input current $I_{IN}$ may be driven toward or follow, respectively, the reference input current $I_{IN}^*$ (ACT 930) by one or more sampling periods, i.e., a delay of one or more switching cycles. In one embodiment driving input current $I_{IN}$ toward a reference input current value $I_{IN}^*$ may include the act of providing power factor correction to input current $I_{IN}$. For example, a rectifier may include a power factor correction (PFC) rectifier that provides power factor correction.

In some embodiments the difference at the $n^{th}$ sampling time between input current $I_{IN(n)}$ and reference input current $I_{IN(n)}^*$ can be referred to as a current error $e_{IN(n)}$. Because in various embodiments many loads operate in a nonlinear fashion with respect to current or power consumption, the converter output current $I_{OUT}$ required by a load can change frequently. As a result input current $I_{IN}$ typically can be controlled and adjusted to regulate output power sent to a load. In general, when current error $e_{IN(n)}$ is zero the input current $I_{IN}$ is at an appropriate value for a converter to function. Because reference input current $I_{IN(n)}^*$ can be expressed relative to duty cycle $D_n$, the duty cycle $D_n$ of the PWM control signal can be adjusted to drive current error $e_{IN(n)}$ towards zero at the $n^{th}$ sampling time, before the $(n+1)^{th}$ sample, (e.g. a sample at a second sampling time) is taken.

Changing the duty cycle $D_n$ in this manner generally drives input current $I_{IN}$ at the first sampling time to a level substantially equal to the reference input current $I_{IN(n)}^*$ after the first sampling time and before the second or another subsequent sampling time. Generally, a new current error $e_{IN(n)}$ may occur at the second or subsequent sampling time. However, continuing with this illustrative embodiment, at this subsequent sampling time input current $I_{IN(n)}$ has been controlled or driven to a value near the level of reference inductor current $I_{IN(n)}^*$ at a previous sampling time. Thus, it is appreciated that adjusting a duty cycle of the PWM control signal in one embodiment can cause input current $I_{IN}$ generally to track reference input current $I_{IN}^*$ by at least one sampling delay.

It is appreciated that in various embodiments the input current $I_{IN}$ at a subsequent sampling time may not be exactly equal to the input reference current $I_{IN}^*$ at a first sampling time. In various embodiments these two values may be substantially equal. For example, in one embodiment the input current $I_{IN}$ at the second, third, or further subsequent sampling time can be driven towards a value within 10% of the reference input current $I_{IN}^*$ at the first sampling time, (i.e. plus or minus 10%). In various other embodiments these values may deviate from each other by more than +/−10% and still be substantially equal.

In one embodiment, method 900 may include the act of providing converter output current $I_{OUT}$ to a load (ACT 935). In various embodiments, output current $I_{OUT}$ may include a frequency that is either synchronous or asynchronous with a frequency of input current $I_{IN}$. Applying the output current $I_{OUT}$ (ACT 935) may but need not include applying the output current of a filter, such as a LC filter, to the load. In various embodiments applying the output current $I_{OUT}$ to the load (ACT 935) includes passing the output current through a diode bridge or other rectifier circuit. In one embodiment providing the output current $I_{OUT}$ (ACT 935) includes making the output current $I_{OUT}$ available to a load whether or not the load is actually present. It is appreciated that in various embodiments method 900 can also include that act of applying a converted output voltage, such as a rectifier output voltage or an inverter output voltage to a load.

Note that in FIGS. 1 through 9, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the digital control systems and methods directed toward the input characteristics of, for example an AC-DC or AC-DC-AC PWM converter that are provided by the systems and methods described herein afford a simple and effective way to reduce or eliminate subharmonic oscillation and total harmonic distortion in input current $I_{IN}$ during an asynchronous mode of operation, i.e., when an converter output frequency is not synchronized with converter input frequency. Eliminating or reducing subharmonic oscillation from input current $I_{IN}$ can reduce distortion in a point of common connection (PCC) converter voltage, and can avoid flux saturation in converter components (e.g., transformers and inductors.)

The systems and methods according to various embodiments are able to reduce input current total harmonic distortion of input current $I_{IN}$ to a rectifier such as a PFC rectifier during a synchronous mode of operation, i.e., when a converter output frequency is synchronous with converter input frequency. Further, the converter may include one or more of a rectifier and an inverter, and the converter may include or be associated with one or more of an uninterruptible power supply, a frequency converter, and a line conditioner. This increases efficiency and compatibility, and lowers cost.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references such as "an embodiment", "some embodiments", "an alternate embodiment", "various embodiments", "one embodiment", or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features mentioned in any claim are followed by reference signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. For example, a moving average filter may be integrated into existing digital converter control schemes. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A method for controlling a converter, comprising:
receiving a voltage signal including a ripple voltage;
determining a control signal based in part on the voltage signal by comparing the voltage signal with a reference signal, the control signal including distortion associated with the ripple voltage;
producing an average control signal by filtering at least a portion of the ripple voltage from the control signal;
generating a reference current value for an input current of the converter based at least in part on the average control signal; and
driving the input current of the converter toward the reference current value.

2. The method of claim 1, wherein driving the input current includes providing power factor correction for the input current of the converter.

3. The method of claim 1, comprising:
shifting a phase of the average control signal.

4. The method of claim 1, comprising:
providing an output current from the converter to a load, wherein the output current has a frequency that is synchronous with a frequency of the input current.

5. The method of claim 1, comprising:
providing an output current from the converter to a load, wherein the output current has a frequency that is asynchronous with a frequency of the input current.

6. The method of claim 1, comprising:
filtering the ripple voltage from the voltage signal; and
driving the voltage signal toward a reference voltage value.

7. The method of claim 6, comprising:
applying the voltage signal to an inverter associated with the converter.

8. The method of claim 1, wherein generating the reference current value comprises:
receiving a root mean squared input signal from the converter.

9. The method of claim 1, wherein driving the input current comprises:
adjusting a duty cycle of a pulse width modulation control signal associated with the input current.

10. The method of claim 1, wherein the ripple voltage includes a rectifier ripple voltage and an inverter ripple voltage.

11. The method of claim 1, comprising:
controlling the converter to operate in one of a synchronous mode of operation and an asynchronous mode of operation.

12. The method of claim 1, wherein the converter comprises at least one of an uninterruptable power supply, a frequency converter, and a line conditioner.

13. The method of claim 1, wherein producing the average control signal comprises:
sampling the control signal at a plurality of time instances of a time period of the voltage signal.

14. The method of claim 1, wherein receiving the voltage signal, determining the control signal, producing the average control signal, generating the reference current value, and driving the input current of the converter toward the reference current value are performed at least in part by a processor, and wherein the method is implemented at least in part by a program stored in a computer readable medium and executed by the processor.

15. A converter, comprising:
an input configured to receive input current;
an output configured to provide output current;
a control module including a filter;

the filter adapted to receive a control signal having distortion associated with a ripple voltage and to produce an average control signal substantially free of the ripple voltage;

the control module adapted to generate a reference current value for the input current based at least in part on the average control signal; and the control module adapted to drive the input current of the converter toward the reference current value.

16. The converter of claim 15, comprising:
a rectifier adapted to receive the input current.

17. The converter of claim 16, comprising:
an inverter associated with the rectifier wherein the input current is in phase with an inverter output current.

18. The converter of claim 16, comprising:
an inverter; and
the filter adapted to remove at least part of a subharmonic oscillation signal from the input current.

19. The converter of claim 16, wherein the ripple voltage includes at least one of a rectifier ripple voltage and an inverter ripple voltage.

20. The converter of claim 16, comprising:
a lead-lag compensator adapted to adjust a phase of the average control signal.

21. The converter of claim 16, comprising:
the rectifier associated with an inverter; and
the filter adapted to remove at least a portion of harmonic distortion from the input current.

22. The converter of claim 21, wherein harmonic distortion is less than or equal to 3.5% of the input current.

23. The converter of claim 16, wherein the control module is adapted to adjust the control signal to drive a rectifier voltage toward a reference voltage value.

24. The converter of claim 23, wherein the control module is adapted to generate the reference current value based at least on part on a root mean squared value of the rectifier voltage.

25. The converter of claim 15, wherein the filter is adapted to remove at least a portion of harmonic distortion from the input current.

26. The converter of claim 15, comprising:
a control signal generator associated with the control module, the control signal generator adapted to adjust a duty cycle of a pulse width modulation control signal to drive the input current of the converter toward the reference current value.

27. The converter of claim 15, comprising at least one of an AC-DC pulse width modulation converter having a rectifier, and an AC-DC-AC pulse width modulation converter having the rectifier and an inverter.

28. The converter of claim 15, comprising at least one of an uninterruptable power supply, a frequency converter, and a line conditioner.

29. The converter of claim 15, comprising:
a converter output current having a frequency of between 55 Hz and 65 Hz.

30. The converter of claim 29, wherein the input current includes a frequency of between 45 Hz and 55 Hz.

31. A system for controlling an uninterruptable power supply, comprising:
means for filtering a control signal having distortion associated with a ripple voltage to produce an average control signal substantially free of distortion;

a control module associated with the uninterruptable power supply and adapted to generate a reference current value for an input current of the uninterruptable power supply based at least in part on the average control signal; and the control module adapted to drive the input current of the uninterruptable power supply toward the reference current value.

32. The system of claim 31, wherein the uninterruptable power supply includes at least one of a frequency converter and a line conditioner.

33. A computer readable medium having stored thereon sequences of instructions including instructions that will cause a processor to control a converter to:
receive information related to a voltage signal including a ripple voltage;

produce an average control signal by filtering at least a portion of the ripple voltage from a control signal;

determine the control signal based in part on the voltage signal by comparing the voltage signal with a reference signal, the control signal including distortion associated with the ripple voltage;

generate a reference current value for an input current of the converter based at least in part on the average control signal;

drive the input current of the converter toward the reference current value; and apply the input current to a rectifier associated with at least one of an uninterruptable power supply, a frequency converter, and a line conditioner.

* * * * *